United States Patent [19]

Suzuki

[11] 3,737,673

[45] June 5, 1973

[54] LOGIC CIRCUIT USING COMPLEMENTARY TYPE INSULATED GATE FIELD EFFECT TRANSISTORS

[75] Inventor: Yasoji Suzuki, Kawasaki, Japan

[73] Assignee: Tokyo Shibaura Electric Co., Ltd., Kawasaki-shi, Japan

[22] Filed: Apr. 22, 1971

[21] Appl. No.: 136,536

[30] Foreign Application Priority Data

Apr. 27, 1970 Japan ................................45/35654
Mar. 3, 1971 Japan ................................46/10785

[52] U.S. Cl. ..................307/205, 307/214, 307/215, 307/221 C

[51] Int. Cl. ........................H03k 19/08, H03k 19/40

[58] Field of Search......................307/205, 215, 218, 307/221 C, 214

[56] References Cited

UNITED STATES PATENTS

| | | | |
|---|---|---|---|
| 3,252,011 | 5/1966 | Zuk | 307/205 |
| 3,267,295 | 8/1966 | Zuk | 307/221 C |
| 3,439,185 | 4/1969 | Gibson | 307/221 C |
| 3,493,785 | 2/1970 | Rapp | 307/221 C |

*Primary Examiner*—John S. Heyman
*Attorney*—Flynn & Frishauf

[57] ABSTRACT

A logic circuit using complementary type IGFET's which comprises an inverter formed of complementary IGFET's and two switching IGFET's for controlling said inverter upon receipt of clock pulses, one of said switching IGFET's being an N channel type and connected to an N channel IGFET of the inverter and the other being a P channel type and connected to a P channel IGFET of the inverter.

12 Claims, 26 Drawing Figures

LOGIC CIRCUIT USING COMPLEMENTARY TYPE INSULATED GATE FIELD EFFECT TRANSISTORS

This invention relates to a logic circuit using complementary type insulated gate field effect transistors (hereinafter referred to as IGFET's) which reverses input signals and an application thereof.

The conventional logic circuits using IGFET's or metal oxide semiconductor FET's abbreviated as MOS-FET's do not adopt complementary IGFET's controlled by clock pulses. Therefore the prior art logic circuits are encountered with various drawbacks as listed below. The substrate electrode of the IGFET used in the prior circuits has back gate voltage, so that clock pulse voltage required to operate the IGFET should have an amplitude increased as much as said back gate voltage. When the IGFET's are rendered conducting upon receipt of input signals and clock pulses, then there flows direct current across a power source and the ground, resulting in increased power consumption. Due to the above direct current, a high transferring conductance gm between IGFET's is not available for withdrawal of output signals from IGFET. Since stray capacity is charged and discharged at different time constants, the operating frequency is regulated by the larger time constant and has its upper limit restricted to a certain extent. Due to a prior circuit pattern and use of two separate clock pulses having different phases, there are presented considerable difficulties in integrating especially a shift register when it is prepared by connecting in series a large number of basic logic circuits performing a half bit delay in turn. While there is supplied only one of the aforesaid clock pulses, there can not be transmitted any information, thus leading to the eventual retard to said information transfer.

It is accordingly the object of this invention to provide a logic circuit comprising a logic circuit element including complementary IGFET's and capable of reversing input signals and two switching IGFET's for controlling said logic circuit elements when supplied with clock pulses whose phases are reversed from each other, thereby enabling low voltage clock pulses to be used in operation, power consumption to be reduced, a high transferring conductance gm to be available operating frequency to be utilized up to a high level, circuit integration to be facilitated and high speed transmission of information to be effected.

This invention can be more fully understood from the following detailed description when taken in connection with the accompanying drawings, in which.

Figure 7:
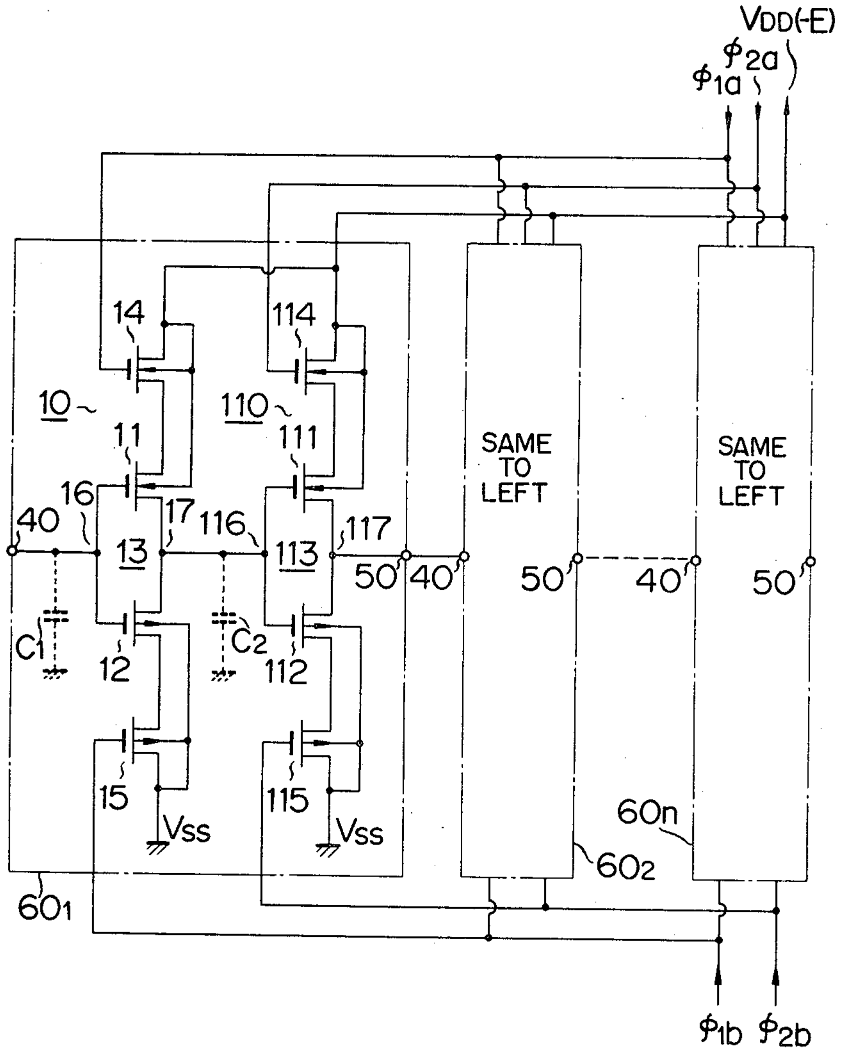
FIG. 7 is a circuit diagram of a shift register constituted by the logic circuit of FIG. 1.
Figure 11:
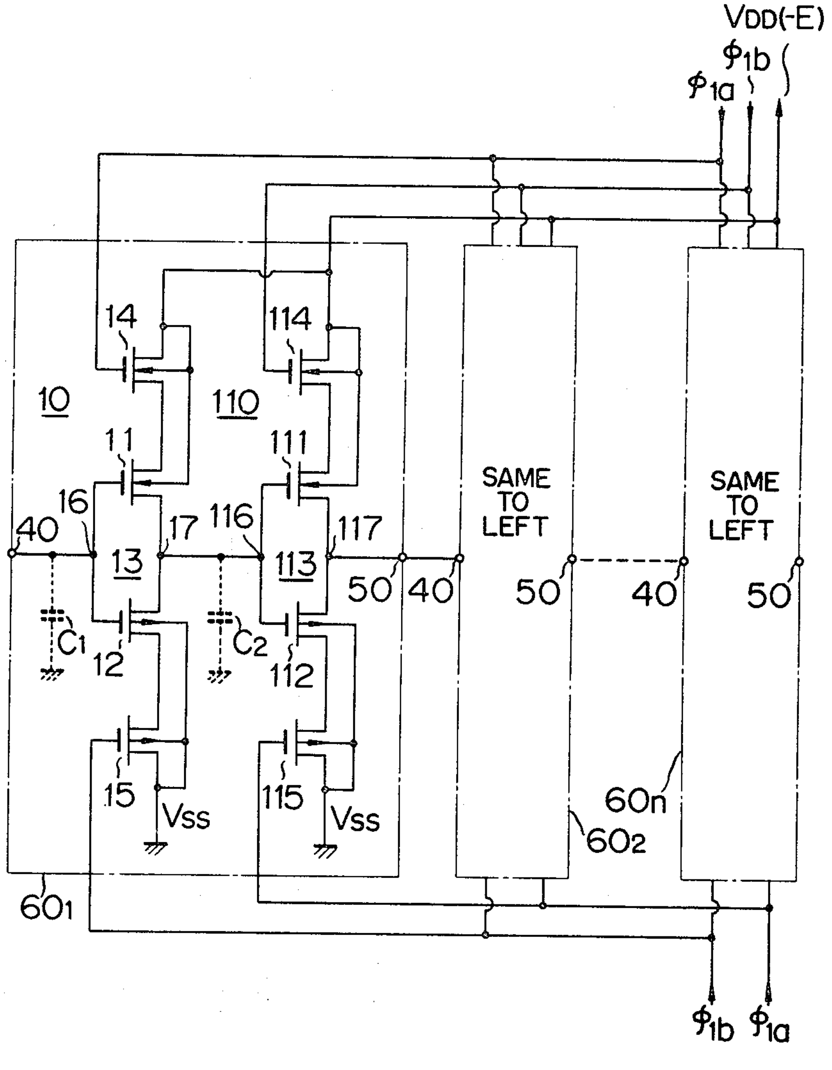
Figures 12A, 12B, 12C, 12D, 12E:
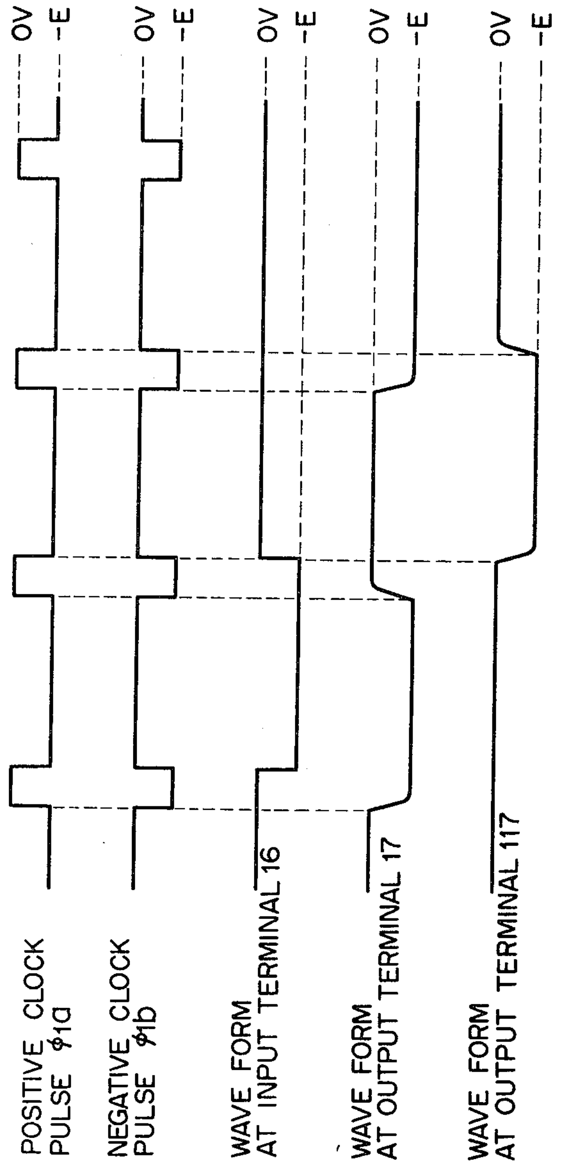
Figure 13:
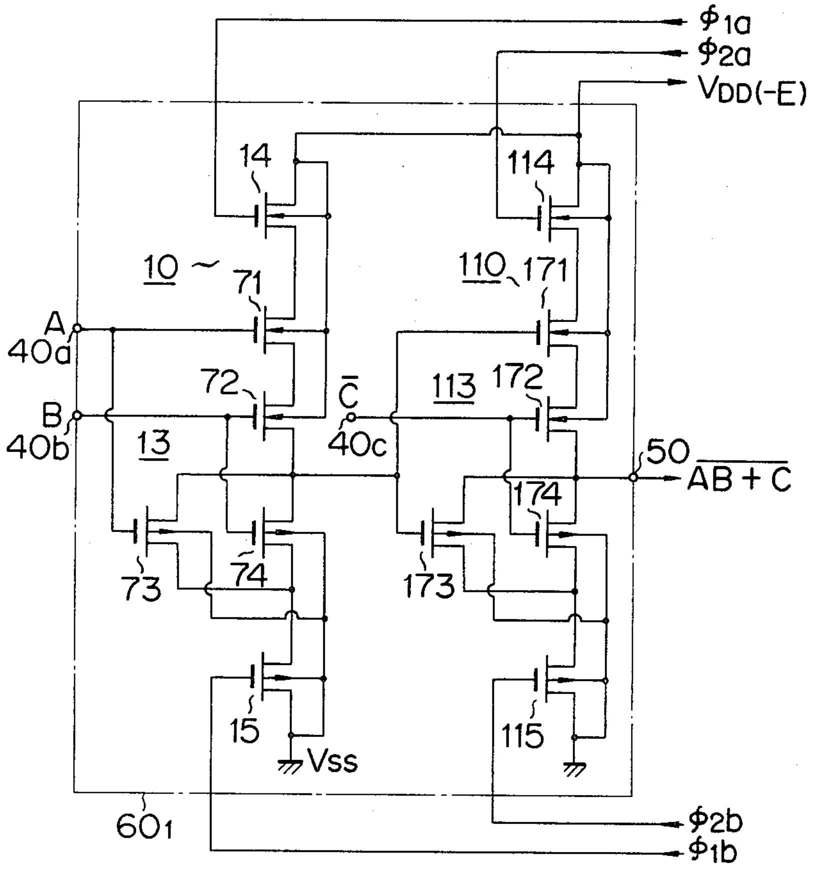

FIGS. 12A–12E indicate the wave form of operating voltage impressed or induced on the main part of the shift register of FIG. 11; and FIG. 13 is a circuit diagram of a modification from the shift register of FIG. 7 according to a further embodiment of the invention.

There will now be described by reference to the appended drawings a logic circuit according to an embodiment of this invention.

As used herein, the drain and source electrodes of the IGFET are defined as follows. Generally, the drain and source electrodes of IGFET, excluding the type prepared for a particular object, little differ in construction unlike the collector and emitter electrodes of a bipolar element consisting of a transistor. Said IGFET is a bilateral element. According to custom, the power source or output side of the FET is designated as a drain electrode and the grounding side thereof as a source electrode. This only applies to the case where the logic circuit is formed of a P or N channel FET alone. Since, however, the logic circuit of this invention comprises a mixture of P and N channel IGFET's, output side is defined as a drain electrode and the source and grounding sides as a source electrode (the source and drain electrode are hereinafter simply referred to as the source and drain respectively).

There will now be described by reference to FIG. 1 the case where the element included in a basic logic circuit according to an embodiment of this invention jointly constitutes an inverter.

The first basic logic circuit 10 of the invention includes a complementary type inverter 13 formed of N and P channel IGFET's 11 and 12; an N channel IGFET 14 disposed as a switching element between the IGFET 11 and the power source; and a P channel IGFET 15 connected similarly as a switching element between the IGFET 12 and the ground. The gate electrodes of the aforesaid IGFET's 11 and 12 are connected together and the contact thereof is used as an input terminal 16. The drain electrodes of the IGFET's 11 and 12 are connected together and the contact thereof is used as an output terminal 17. The source of the IGFET 11 is connected to the drain of the IGFET 14, the source of which is connected to a negative bias power source $V_{DD}(-E)$. (The substrate electrodes hereinafter referred to as the substrate) of the IGFET's 11 and 14 are collectively connected to said power source $V_{DD}(-E)$. The gate of the IGFET 14 is supplied with a first positive clock pulse $\phi_{1a}$. The source of the FET 12 is connected to the drain of the IGFET 15, the source of which is grounded or connected to a positive power source $V_{SS}$. The substrates of the IGFET's 12 and 15 are also grounded. The gates of the IGFET 15 is supplied with a first negative clock pulse $\phi_{1b}$. These clock pulses $\phi_{1a}$ and $\phi_{1b}$ consist of pulse trains reversed only in phase and having a prescribed synchronization period.

When the gates of the switching N and P channel IGFET's 14 and 15 are supplied with positive and negative clock pulses $\phi_{1a}$ and $\phi_{1b}$ respectively, then said IGFET's 14 and 15 are rendered conducting. When the input terminal 16 is supplied with positive input pulse signals having about zero volt, the N channel IGFET 11 is actuated, while the P channel IGFET 12 is made non-conducting. Conversely where the input terminal 16 is supplied with negative input pulse signals having about (−E) volt, then the N channel IGFET 11 becomes inoperative and the P channel IGFET 12 is actuated. Unless the gates of the IGFET's 14 and 15 are supplied with clock pulses $\phi_{1a}$ and $\phi_{1b}$ respectively, the aforesaid IGFET's 14 and 15 remain non-conducting, even when the input terminal 16 is supplied with positive or negative pulse signals and both the IGFET's 11 and 12 are made operative. Apparently, both IGFET's 11 and 12 are rendered non-conducting and the output terminal 17 is disconnected from the positive and negative power sources.

There will now be described by reference to FIGS. 2A to 2D the concrete operation of the embodiment of FIG. 1. When the input terminal 16 of the inverter 13 is supplied with input signals, an input gate capacitor $C_1$ associated with said input terminal 16 is charged or discharged. When, upon receipt of positive input pulse signals, the capacitance of said capacitor $C_1$ has positive voltage (about zero volt) (FIG. 2C), then the IGFET 11 is ready to be operated and the IGFET 12 becomes inoperative. When, after this, the gate of the IGFET 14 is supplied at time $t_1$ with positive clock pulses $\phi_{1a}$ (FIG. 2A), then the IGFET 14 is also made conducting, resulting in a low impedance between the power source (−E) and output terminal 17. As a result, the input capacitor $C_2$ existing in an input side of the succeeding semiconductor device is negatively charged by the power source (−E) through the route of power source (−E) → IGFET 14 → IGFET 11 → capacitor $C_2$ →ground. However, the energy thus charged is reduced by voltage drop in the IGFET's 14 and 11. The charge constant at this time may be expressed as $(R_{14}+R_{11})C_2$. It will be noted that $R_{14}$ and $R_{11}$ denote the values of interior resistance of IGFET's 14 and 11. As a result, the output terminal 17 has negative voltage (about (−E) volt) (FIG. 2D). When, in time $t_2$, the input terminal 16 is supplied with input signals having negative voltage (about (−E) volt) (FIG. 2C), then the IGFET 11 becomes inoperative and the IGFET 12 is operated. When, in time $t_3$, the gate of the IGFET 15 is supplied with negative clock pulses $\phi_{1b}$ (FIG. 2B), said IGFET 15 is rendered conducting, thus resulting in a low impedance between the power source (grounding) and output terminal 17. Accordingly, the negative charge stored in the following input gate capacitor $C_2$ is discharged through the route of capacitor $C_2$ → IGFET 12 → IGFET 15 → ground. The discharge constant at this time may be expressed as $(R_{12}+R_{15})C_2$. It will be noted that $R_{12}$ and $R_{15}$ denote the values of interior resistance of the IGFET's 12 and 15. Thus the output terminal 17 has a positive voltage (about zero volt) (FIG. 2D). when, in time $t_4$, the input terminal 16 is again supplied with positive input signals (FIG. 2C) and, in time $t_5$, the gate of the IGFET 14 is supplied with positive clock pulse $\phi_{1a}$ (FIG. 2A), the following input capacitor $C_2$ is charged to about (−E) volt, and the output terminal 17 is supplied with negative voltage (FIG. 2D). Thus the input pulse signals A supplied to the input terminal 16 are reversed under control of positive and negative clock pulses $\phi_{1a}$ and $\phi_{1b}$ and supplied as output signal $\overline{A}$ to the output terminal 17 with the result that this logic circuit 10 performs a half bit delay.

According to the aforementioned embodiment of this invention, the substrate of the IGFET is connected to a power source or grounded, preventing the generation of back gate voltage and enabling operation to be carried out by low amplitude clock pulses and effective loss in the circuit to be decreased. Even when the IGFET's 11 and 14 are made conducting, the IGFET's 12 and 15 remain inoperative, so that there does not flow any direct current between the power source (−E) and the ground, thus reducing power consumption. Further, if the sum $R_{11}+R_{14}$ of the interior resistance of the IGFET's 11 and 14 when they are actuated is made equal to the sum $R_{12}+R_{15}$ of the interior resistances of the IGFET's 12 and 15 when they are rendered conducting, charge and discharge are performed at an equal time constant with the effect that operating frequency can be utilized up to a high level. Further, use of two clock pulses reversed only in phase facilitates the preparation of a clock pulse control circuit. A high speed transmission of information is attained using clock pulses disclosed above. As complementary IGFET's are used, this logic circuit is simple in construction and is easily formed of an integrated circuit. Since a transient current in the logic circuit is controlled by switching IGFET's receiving clock pulses, power consumption can be decreased down to the reciprocal of a duty factor of the clock pulses. This invention can realize the aforementioned favorable effects.

Figure 3:
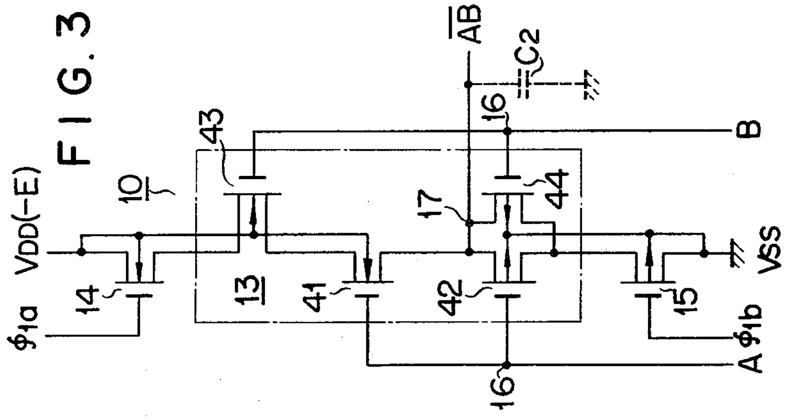
FIG. 3 is a circuit diagram of another embodiment of the invention.

There will now be described by reference to FIGS. 3 to 6 the case where an element 13 included in a basic logic circuit is supplied with a plurality of input signals. The same parts of FIGS. 3 to 6 as those of FIG. 1 are denoted by the same numerals and description thereof is omitted. Referring to FIG. 3, when there are supplied two input signals A and B, said elements consisting of a pair of complementary IGFET's performs NAND logic operation. Said NAND logic circuit element is formed of a combination of complementary IGFET's 41 and 42 whose gates are supplied with input signal A and other complementary IGFET's 43 and 44 whose gates are supplied with input signal B, causing output signals $\overline{AB}$ to be drawn out from the drains of the IGFET's 42 and 44.

When both input signals A and B are positive and the gate of the IGFET 14 is supplied with positive clock pulses $\phi_{1a}$, then the following input gate capacitor $C_2$ is negatively charged by the power source (−E), producing at the output terminal 17 negative signals $\overline{AB}$ with respect to said input signals A and B.

Figure 4:
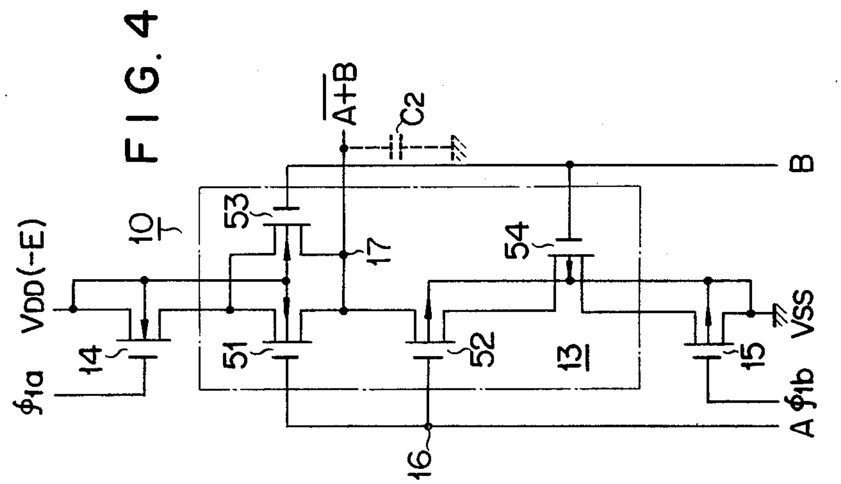
FIG. 4 is a circuit diagram of another embodiment of the invention.

According to the embodiment of FIG. 4, when supplied with two input signals A and B, a basic logic circuit element 13 consisting of a pair of complementary IGFET's performs NOR logic operation. Said NOR logic circuit element is prepared from a combination of complementary IGFET's 51 and 52 whose gates are supplied with input signal A and other complementary IGFET's 53 and 54 whose gates are supplied with input signal B, causing output signals $\overline{A+B}$ to be drawn out from the drains of the IGFET's 51 and 53.

When either of said input signals A and B is positive and the gate of the IGFET 14 is supplied with positive clock pulses $\phi_{1a}$, then the succeeding input capacitor $C_2$ is negatively charged by the power source (−E), producing at the output terminal output signal $\overline{A+B}$ with respect to said input signals A and B.

Figure 5:
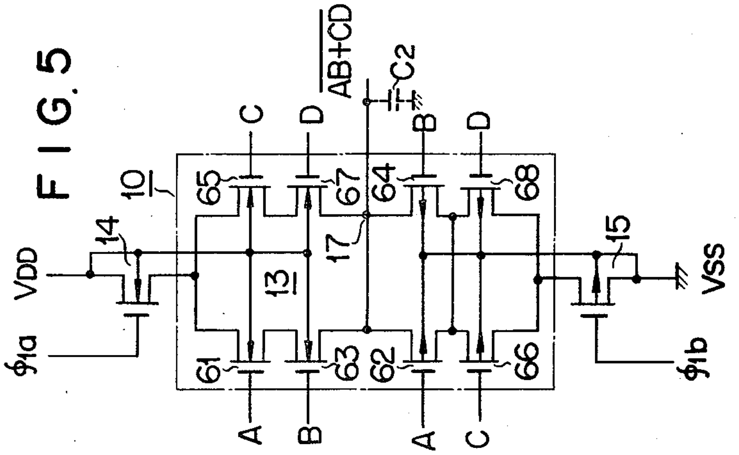
FIG. 5 is a circuit diagram of still another embodiment of the invention.

According to the embodiment of FIG. 5, when supplied with four input signals A, B, C and D, a basic logic circuit element 13 consisting of four pairs of complementary IGFET's carries out AND-NOR logic operation.

Said AND-NOR logic circuit element is formed of a combination of complementary IGFET's 61 and 62, complementary IGFET's 63 and 64, complementary IGFET's 65 and 66 and complementary IGFET's 67 and 68, the gates of the IGFET's 61 to 68 constituting these pairs being supplied with input signals A, B, C and D respectively, and output signals being drawn out from the drains of the IGFET's 62, 63, 64 and 67. Where either of the two pairs of input signals, that is, A–B and C–D is positive, the succeeding input capacitor $C_2$ is negatively charged by the power source (−E), producing negative signals $\overline{AB + CD}$ at the output terminal 17.

Figure 6:
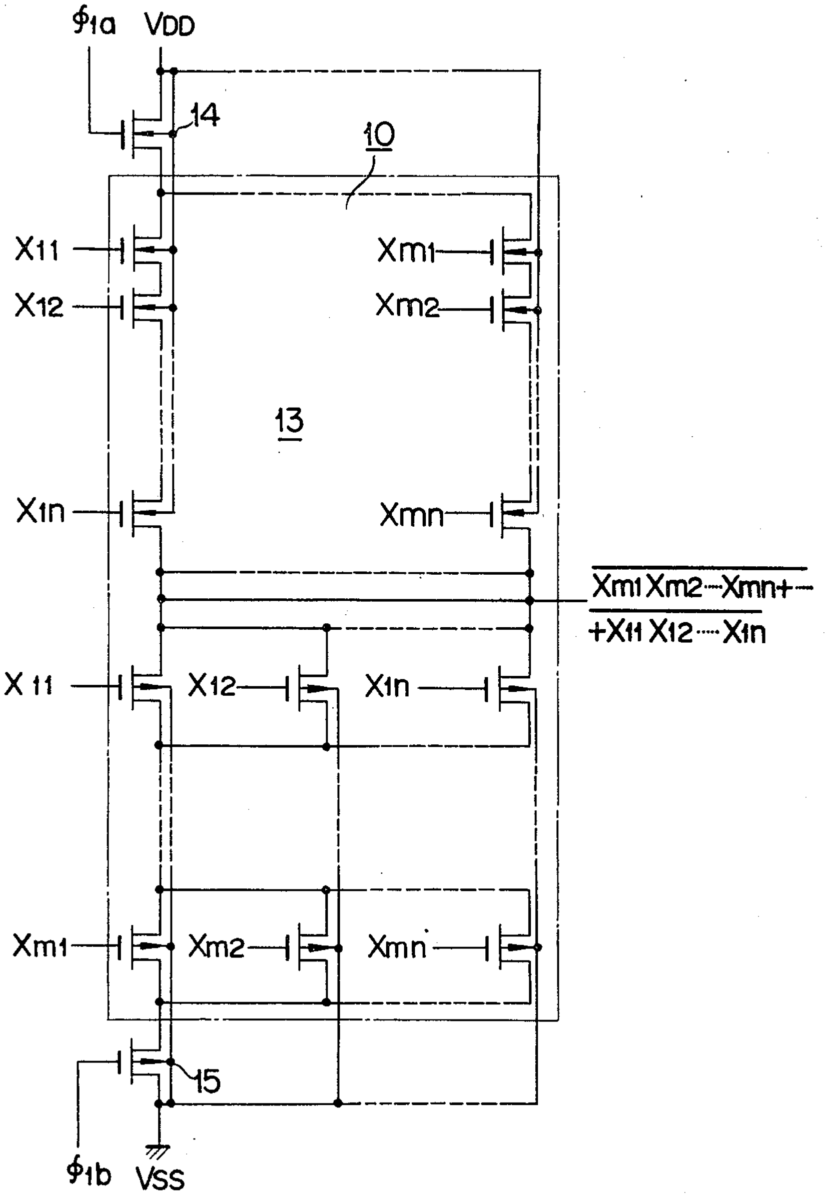
FIG. 6 is a circuit diagram modified from the embodiment of FIG. 5.

According to the modification of FIG. 6 from the 11 of FIG. 5, the AND-NOR basic logic circuit element 13 consists of an $m{\cdot}n$ pairs of complementary IGFET's having a $2{\cdot}m{\cdot}n$ number of input gates. When the input gates of the complementary IGFET's are supplied with input signals $X_{m1}, X_{m2} \ldots X_{mn}, \ldots X_{11}, X_{12} \ldots X_{1n}$, then there are obtained output signals $\overline{X_{m1}{\cdot}X_{m2}{\cdot} \ldots X_{mn} + X_1 \ldots X_{1n}}$.

Figure 1:
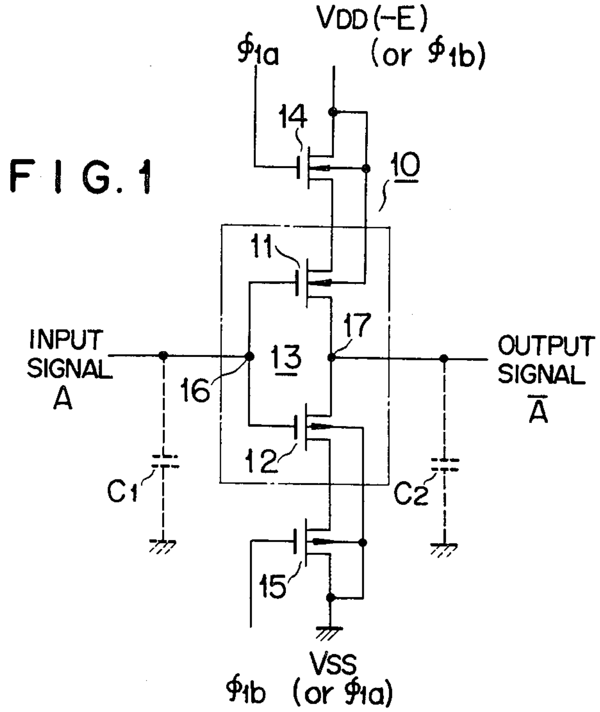
FIG. 1 is a circuit diagram of a logic circuit according to an embodiment of this invention.
Figures 2A, 2B, 2C, 2D:
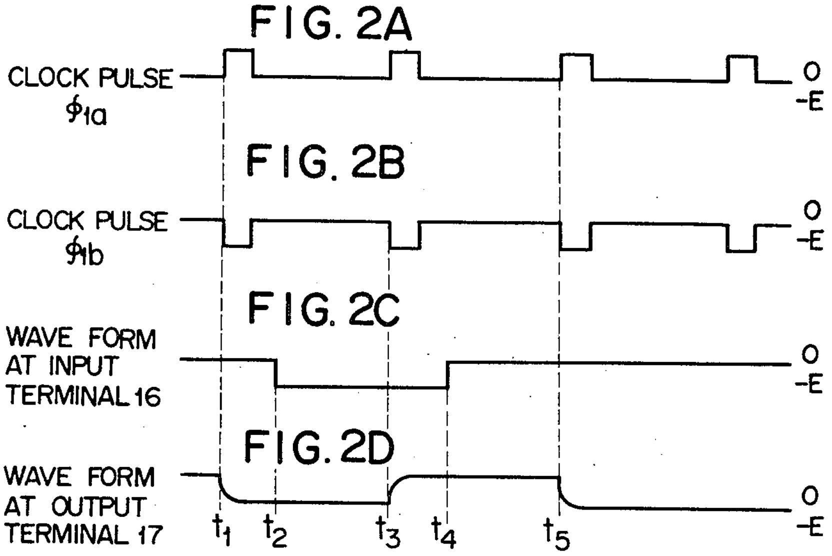
FIGS. 2A to 2D represent the wave forms of operating voltage impressed or induced on the main part of the logic circuit of FIG. 1.

The logic circuits of FIGS. 3 to 6 can display the same effect as the embodiment of FIG. 1.

There will now be described by reference to FIGS. 7 to 13 other embodiments wherein there are connected in series a plurality of basic logic circuits of the same type as shown in FIG. 1 to constitute a logic circuit acting as a shift register. The same parts of FIG. 7 as those of FIG. 1 are denoted by the same numerals and description thereof is omitted.

According to FIG. 7, there are connected two basic logic circuits 10 and 110 having the same arrangement as that of FIG. 1 to form a shift register unit $\mathbf{60_1}$ for carrying out a delay of 1 bit. An n number of said units is connected in series to constitute a shift register for performing a delay of n bits as a whole. The input terminal 116 of the complementary IGFET's 111 and 112 constituting the inverter 113 of the second basic logic circuit 110 is supplied with output signals from the output terminal 17 in the first basic logic circuit 10 to draw out signals delayed half a bit from the output terminals 117. The gates of the switching IGFET's 114 and 115 are supplied with a second positive or negative clock pulse $\phi_{2a}$ or $\phi_{2b}$ displaced in phase to a prescribed extent from the first positive or negative clock pulse $\phi_{1a}$ or $\phi_{1b}$ supplied to the first basic logic circuit 10.

Figures 8A, 8B, 8C, 8D, 8E, 8F, 8G:
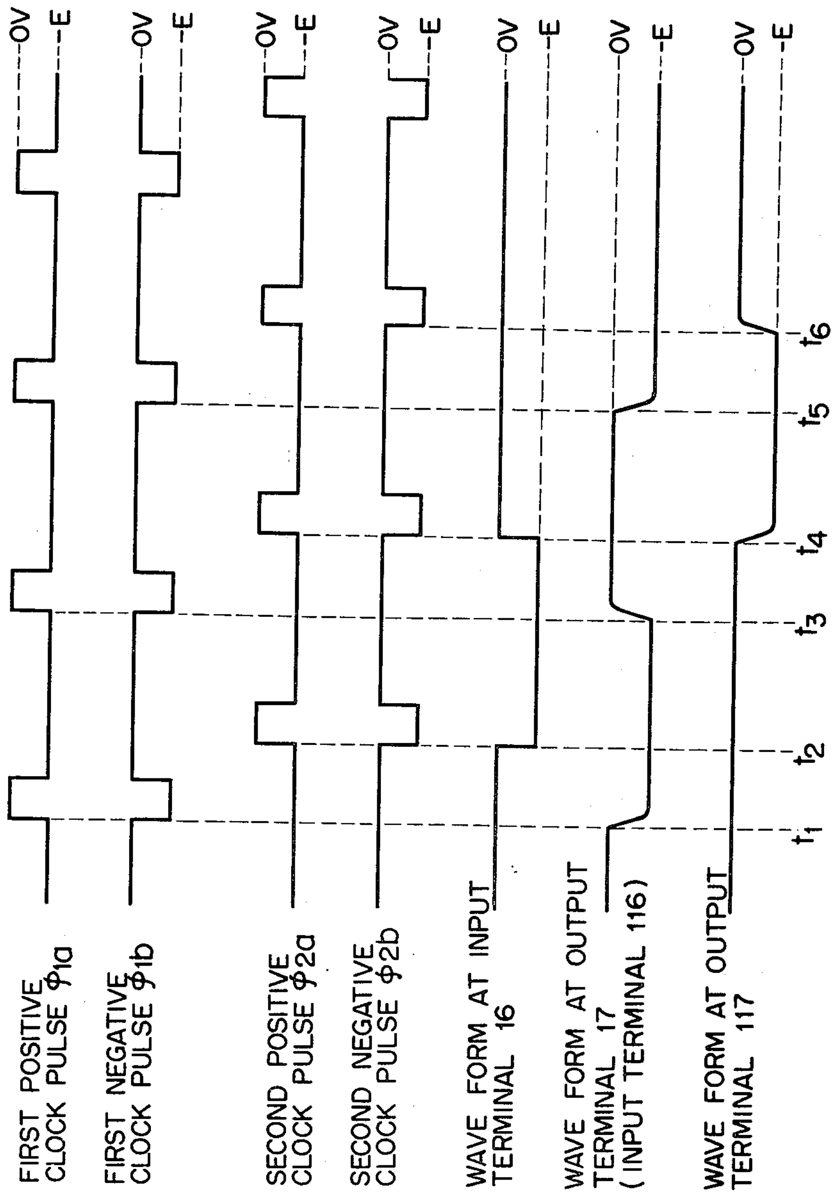
FIGS. 8A to 8G show the forms of operating voltage impressed or induced on the main part of a shift register formed of the logic circuit of FIG. 7.

There will now be described by reference to FIGS. 8A to 8G the operation of the shift register of FIG. 7. When the input terminal 16 of the inverter 13 of the first basic logic circuit 10 is supplied with positive input signals through an input terminal point 40, the input gate capacitor $C_1$ is positively charged to about zero volt (FIG. 8E). When, in time $t_1$, the gate of the IGFET 14 is supplied with the first positive clock pulse $\phi_{1a}$ (FIG. 8A), then the IGFET's 11 and 14 are rendered conducting, causing the input capacitor existing in the input side of succeeding semiconductor device or the input gate capacitor $C_2$ of the inverter 113 of the second basic logic circuit 110 to be negatively charged by the power source (−E) and the output terminal 17 to have negative voltage of (−E) volt (FIG. 8F). When, in time $t_2$, the input terminal 16 is supplied with negative input signals, then the IGFET 11 becomes inoperative and the IGFET 12 is made conducting. When, in time $t_3$, the IGFET 15 is supplied with the first negative clock pulse $\phi_{1b}$ (FIG. 8B), then the IGFET 15 is also actuated, causing the negative charge of the input gate capacitor $C_2$ to be discharged to the ground and the output terminal 17 to have positive voltage (FIG. 8F). When said positive signals are supplied to the input terminal 116 of the inverter 113 of the second basic logic circuit 110, the IGFET 111 is rendered conducting and the IGFET 112 becomes inoperative. When, in time $t_4$, the gate of the switching IGFET 114 of the second basic logic circuit 110 is supplied with a second positive clock pulse $\phi_{2a}$, then the IGFET 114 is operated, causing the input gate capacitor (not shown) of the succeeding shift register unit $\mathbf{60_2}$ to be negatively charged by the power source (−E) and the output terminal 117 to have negative voltage (FIG. 8G). When the first basic logic circuit 10 is later supplied again with positive input signals (FIG. 8E), and, in time $t_5$, the IGFET 14 of the first basic logic circuit 10 is supplied with the first positive clock pulse $\phi_{1a}$ (FIG. 8A), then the output terminal 17 of said circuit 10 is supplied with negative voltage (FIG. 8F), causing the input terminal 116 of the second logic circuit 110 to be also supplied with negative voltage, and the IGFET 111 to become inoperative and the IGFET 112 to be made conducting. When, in time $t_6$, the IGFET 115 of the second logic circuit 110 is supplied with the second negative clock pulse $\phi_{2b}$, then the IGFET 115 is also made conducting, causing the negative charge of the input gate capacitor of the second shift register unit $\mathbf{60_2}$ to be discharged to the ground, the output terminal 117 to be supplied with positive voltage (FIG. 8G) and the output terminal point 50 to produce positive signals.

Input signals supplied to the input terminal point 40 of the first shift register unit $\mathbf{60_1}$ are controlled by the first and second positive clock pulses $\phi_{1a}$ and $\phi_{2a}$ and first and second negative clock pulses $\phi_{1b}$ and $\phi_{2b}$ generated in the first and second basic logic circuits 10 and 110 so as to be delayed half a bit respectively. Accordingly, there are drawn out output signals delayed 1 bit from the output terminal point 50 of the first shift register unit $\mathbf{60_1}$. Thus connection in series of shift register units $\mathbf{60_1} \ldots \mathbf{60_n}$ constitutes a shift register capable of shifting input signals 1 bit in turn and carrying out n-bit shifting in total.

The embodiment of FIG. 7 represents the same effect as that of FIG. 1, and especially offers advantage in forming a shift register in an integrated circuit type.

The embodiment of FIG. 7 relates to the case where there were used four clock pulses $\phi_{1a}$, $\phi_{1b}$, $\phi_{2a}$ and $\phi_{2b}$ having different phases. Alternatively, it is possible to attain the object of this invention by generating in a circuit device either of the two pairs of clock pulses $\phi_{1a} - \phi_{2a}$ and $\phi_{1b} - \phi_{2b}$ and reversing the phases of said clock pulses by an inverter, namely, using only two clock pulses having different phases.

Figure 9:
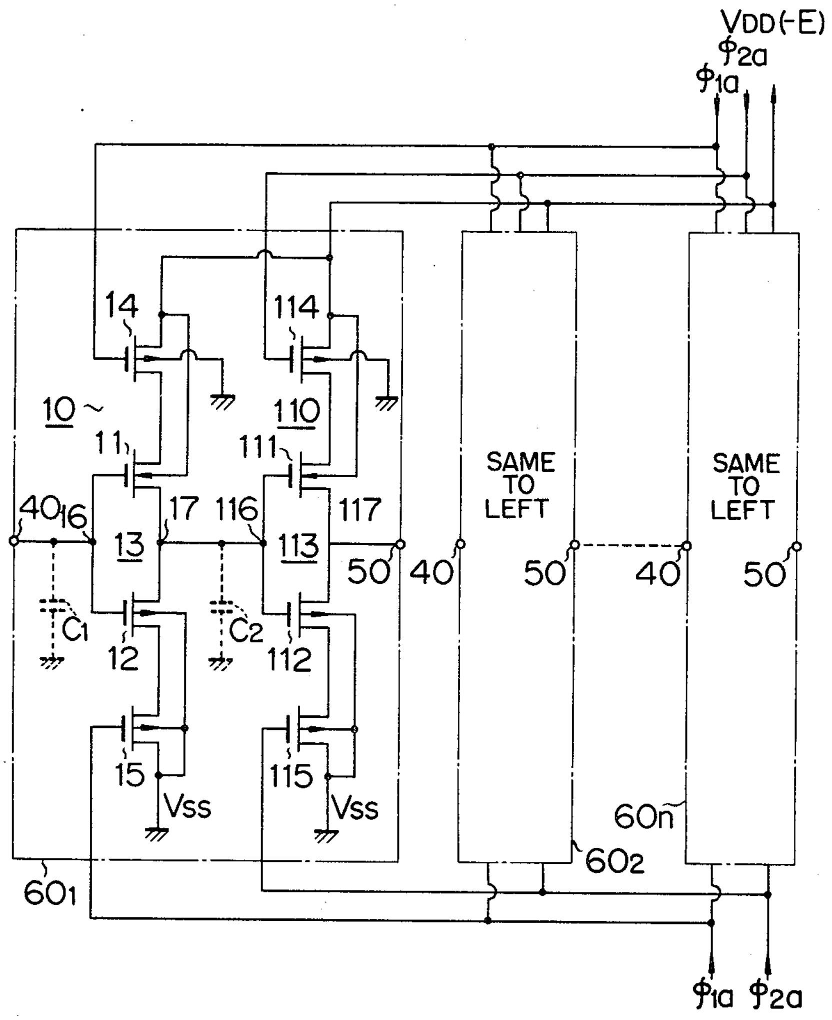
FIGS. 9 to 11 are circuit diagrams modified from the shift register of FIG. 7.

There will now be described by reference to FIGS. 9 to 11 further modifications of the shift register of FIG. 7. The same parts of these figures as those of FIG. 7 are denoted by the same numerals and description thereof is omitted. The difference between FIGS. 9 and 7 is that the former comprises the same P channel IGFET's to be used as switching elements 14, 15, 114 and 115 for control of charge and discharge. This arrangement only requires two negative clock pulses having different phases. Conversely, if said switching elements 14, 15, 114 and 115 for control of charge and discharge consist of the same N channel IGFET's, then there are similarly required only two positive clock pulses having different phases. The embodiment of FIG. 9 displays the same effect as the preceding ones. It is noted that those sides of IGFET's 14 and 114 which are connected to the power source are denoted as drains and the substrates of IGFET's 14 and 114 are connected to the ground.

Figure 10:
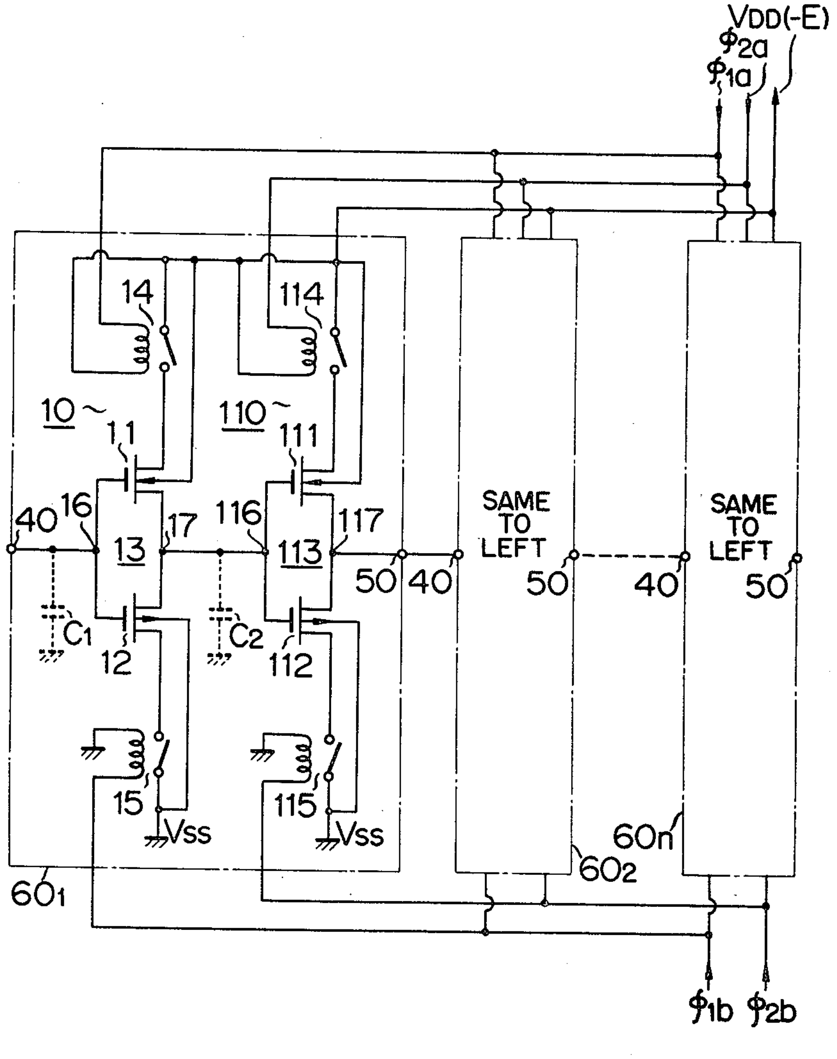

The difference between the embodiment of FIGS. 10 and 7 is that the switching elements 14, 15, 114 and 115 of FIG. 7 are substituted by mechanical contact type switches, that is, relays. This arrangement can also obtain the same effect as the preceding embodiments. Alternatively, said relays may be replaced by others, for example, no-contact switches.

The embodiment of FIG. 11 does not use two pairs of clock pulses $\phi_{1a} - \phi_{1b}$ and $\phi_{2a} - \phi_{2b}$ as in FIG. 7, but carries out the shifting of information simply by one pair of clock pulses $\phi_{1a} - \phi_{1b}$ reversed in phase from each other. Still, the embodiment of FIG. 11 gives the same result as the preceding ones. FIGS. 12A to 12E represent the wave forms of operating voltage impressed on the main part of a logic circuit in the case of FIG. 11.

The foregoing embodiments of FIGS. 7, 9, 10 and 11 relate to the case where the shift register was composed of the first and second basic logic circuits 10 and 110 each including a complementary type inverter shown in FIG. 1 so as to act as a shift register unit. It will be apparent that the object of this invention can be attained by constituting a shift register by various basic logic circuit elements shown in FIGS. 3 to 6.

It is further possible, as shown in FIG. 13 to combine two inverters consisting of two pairs of complementary IGFET's 71–73 and 72–74 respectively to constitute a first basic logic circuit 10 performing NAND operation; combine two other inverters consisting of two pairs of complementary IGFET's 171–173 and 172–174 to constitute a second basic logic circuit 110 having the same arrangement as the first logic circuit 10; supply the inverter of the first basic logic circuit with input signals A and B and supply that of the second basic logic circuit with a sum of the output from said first logic circuit 10 and another input signal $\overline{C}$ to form an AND-OR logic circuit producing output signals AB + C from the second basic logic circuit 110, thereby setting up a shift register unit $\mathbf{60_1}$. This arrangement also has the same effect as the embodiment of FIG. 7.

The foregoing description relates to the case where the basic logic circuit of this invention is used in constituting a shift register. It will be apparent that said logic circuit may also be applied in forming a full adder or subtractor or any other circuits. Further with the aforementioned embodiments, the power source $V_{DD}$ was chosen to have (−E) volt, and power source $V_{SS}$ to have + zero volt. However, the power source $V_{DD}$ may have − zero volt and the power source $V_{SS}$ (+E) volt. Also, the power source $V_{DD}$ may have (+E) volt and the power source $V_{SS}$ − zero volt. In these cases, the complementary N and P channel IGFET's used in the aforementioned embodiments should, of course, be exchanged for each other. The IGFET's in the foregoing description all consisted of an enhancement type, but may obviously be formed of a depression type.

As mentioned above, this invention provides a logic circuit which consists of complementary IGFET's and switching IGFET's and is operated under control of low level clock pulses, thus enabling power consumption to be reduced, operating frequency to be utilized up to a high level, information to be transmitted at a high speed and the integration of said logic circuit to be facilitated.

What we claim is:

1. A logic circuit comprising:

input and output terminals, said input terminals supplying binary coded signals;

first and second sources of power, said first source being more positive than said second source;

a signal storage logic circuit element which includes at least one complementary pair of one N channel and one P channel insulated gate field effect transistors (IGFET) for signal storage, the gate electrodes of said IGFET's being mutually connected together to the input terminal, the drain electrodes of said IGFET's being connected together to the output terminal, and the substrate electrodes of said N channel IGFET and said P channel IGFET being directly connected respectively to the second and first power sources;

two switching elements respectively connected between the source electrodes of each of said complementary pair of signal storage IGFET's and said first and second power sources; and means for supplying the gates of said switching elements with clock pulses of a predetermined phase so that when the binary coded signals are supplied at the input terminal, the logic circuit momentarily stores input signals in the gate capacitance present between ground and the commonly connected gates of said complementary pair of signal storage IGFET's and then, when said clock pulse is impressed on the gates of said switching elements, the stored input data signals are produced from the output terminal as output signals time delayed half a bit and inverted in phase from the input signals.

2. A logic circuit according to claim 1 wherein said signal storage logic circuit element further includes at least one additional P channel IGFET having its drain-source path connected in parallel to the drain-source path of said P channel IGFET constituting said complementary pair of signal storage IGFET's and at least one additional N channel IGFET having its drain-source path connected between the source of said N channel IGFET constituting said complementary pai of signal storage IGFET's and the corresponding one of said switching elements, the gates of said additional P and N channel IGFET's being connected together to an additional input terminal to be supplied with additional binary coded signals separate from said first-mentioned binary coded signals, the logic circuit operating as a NAND logic circuit with respect to the binary input signals.

3. A logic circuit according to claim 1 wherein said signal storage logic circuit element further includes at least one additional N channel IGFET having its drain-source path connected in parallel to the drain-source path of said N channel IGFET constituting said complementary pair of signal storage IGFET's and at least one additional P channel IGFET having its drain-source path connected between the source of said P channel IGFET constituting said complementary pair of signal storage IGFET's and the corresponding one of said switching elements, the gates of said additional P and N channel IGFET's being connected together to an additional input terminal to be supplied with additional binary coded signals separate from said first-mentioned binary coded signals, the logic circuit operating as a NOR logic circuit with respect to the binary input signals.

4. A logic circuit according to claim 1 wherein said switching elements comprise a complementary pair of IGFET's which include an N channel IGFET having its drain-source path connected between the source of said N channel IGFET constituting said complementary pair of signal storage IGFET's and said negative power source and having its gate impressed with a clock pulse of a predetermined phase, and a P channel IGFET having its drain-source path connected between the source of said P channel IGFET constituting said complementary pair of signal storage IGFET's and said positive power source and having its gate impressed with a clock pulse of an inverted phase to that of said clock pulse to be impressed on the gate of said paired N channel IGFET.

5. A logic circuit according to claim 1 wherein said switching elements comprise two IGFET's having their drain-source paths connected between the sources of said P and N channel IGFET's constituting said complementary pair of signal storage IGFET's and said positive and negative power sources and having their gates impressed with clock pulses of the same phase.

6. A logic circuit according to claim 5 wherein said switching elements comprise two P channel IGFET's.

7. A logic circuit according to claim 5 wherein said switching elements comprise two N channel IGFET's.

8. A logic circuit according to claim 1 wherein said switching elements are relays.

9. A shift register comprising a plurality of cascade connected shift register units, each shift register unit comprising a pair of basic logic circuits, each basic logic circuit including a logic circuit element comprised of at least one complementary type IGFET unit, each unit comprising at least one pair of complementary type insulated gate field effect transistors (IGFET's), each pair including an N channel IGFET and a P channel IGFET; each basic logic circuit having an input terminal to which there are connected the gate electrode of said complementary IGFET's and an output terminal to which there are connected to the drain electrodes of said IGFET's; a negative source of power coupled to the source and connected directly to the substrate electrodes of the complementary N channel IGFET and a positive source of power coupled to the source and connected directly to the substrate electrodes of the complementary P channel IGFET; and switching elements connected between the source electrodes of said complementary IGFET's and said positive and negative power sources; the output terminal of one of said pair of basic logic circuits being connected to the input terminal of the other, so as to perform a one-bit delay; the input terminal of the switching element constituting a first basic logic circuit being adapted to receive a first clock pulse having a prescribed period, and the input terminal of the switching element constituting said other basic logic circuit being adapted to receive a second clock pulse differentiated in phase from the first clock pulse to thereby carry out the shifting of data in said shift register.

10. A logic circuit according to claim 9 wherein the logic circuit element is an inverter.

11. A logic circuit according to claim 9 wherein the logic circuit element is a NAND logic circuit.

12. A logic circuit according to claim 9 wherein the logic circuit element is a NOR logic circuit.

* * * * *